United States Patent [19]

Kempster

[11] 4,272,167
[45] Jun. 9, 1981

[54] PROJECTOR CARTRIDGE FOR A FILMSTRIP AND A TAPE CASSETTE

[76] Inventor: Fred G. Kempster, 44046 Yorkshire, Canton, Mich. 48187

[21] Appl. No.: 960,794

[22] Filed: Nov. 15, 1978

[51] Int. Cl.³ .............................................. G03B 31/04
[52] U.S. Cl. ..................................... 353/120; 206/387; 352/78 R; 353/19
[58] Field of Search ........................ 353/15, 19, 120; 206/387; 352/78 R

[56] References Cited

U.S. PATENT DOCUMENTS

| | | | |
|---|---|---|---|
| 3,620,367 | 11/1971 | Stembel | 206/387 |
| 3,799,420 | 3/1974 | Badalich | 353/19 |
| 4,016,378 | 4/1977 | Arthur | 200/293 |
| 4,149,220 | 4/1979 | Crall et al. | 200/293 |

Primary Examiner—Steven L. Stephan
Attorney, Agent, or Firm—Reising, Ethington, Barnard, Perry & Brooks

[57] ABSTRACT

A cartridge is disclosed for an audiovisual filmstrip projector. The cartridge holds a filmstrip and a standard magnetic tape cassette. Spring hooks are provided on a mounting plate of the cartridge for releasably attaching the cassette by a single motion of pressing the cassette toward the mounting plate and for allowing removal of the cassette from the cartridge by a single motion of pulling the cassette away from the mounting plate.

3 Claims, 4 Drawing Figures

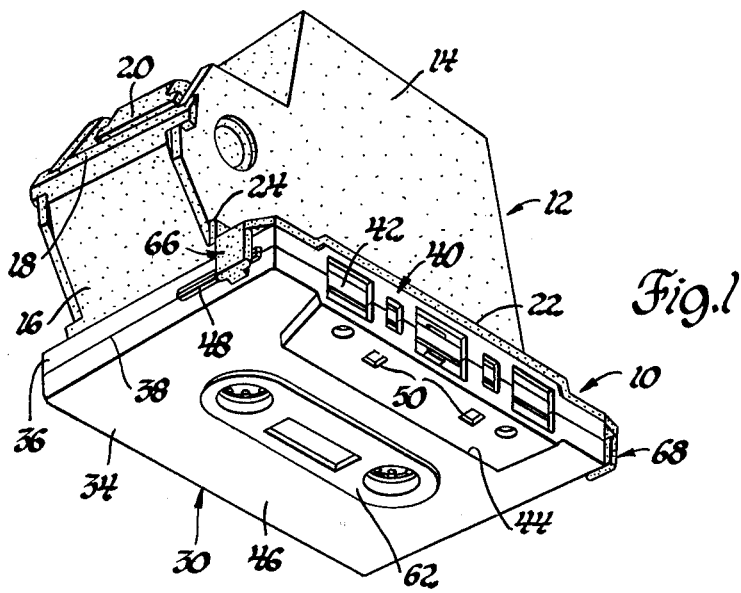
Fig.1
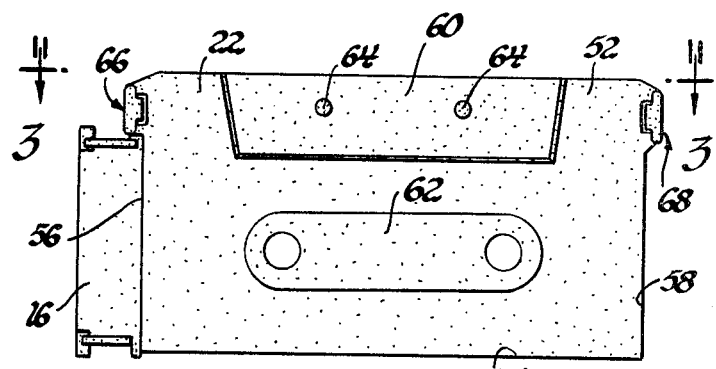
Fig.2
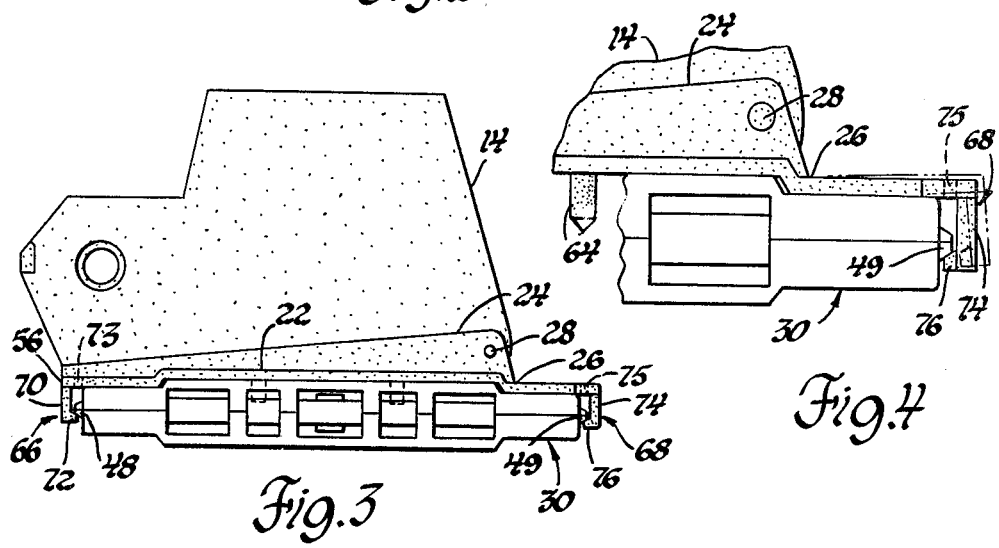
Fig.3
Fig.4

PROJECTOR CARTRIDGE FOR A FILMSTRIP AND A TAPE CASSETTE

TECHNICAL FIELD

This invention relates to audiovisual equipment and more particularly it relates to a projector cartridge for holding a filmstrip and a cassette for magnetic recording tape.

BACKGROUND ART

Filmstrip projectors with synchronized sound recording are widely used for various purposes including training and sales promotion. Such projectors utilize a magnetic tape recording which is played in a synchronized manner with the advancement of the filmstrip. One well-known projector of this type is sold under the trademark "Filmosound 35" as model 756 by the Bell & Howell Company of Chicago, Ill. This projector uses a 35 millimeter filmstrip and a standard magnetic tape cassette in a single cartridge to facilitate handling and the loading of the projector.

To prepare the cartridge for use in the projector, the cartridge is loaded with a filmstrip and with a companion magnetic tape cassette. Typically, this preparation in the first instance, is done by the producer of the audiovisual materials. It is not uncommon for a producer to supply loaded cartridges in large numbers so that the loading is done on a production-line basis. In use of a cartridge with a projector, in case of audio-recording on both tape tracks for the same filmstrip, the user will be required to remove and reload the cassette into the cartridge. In the interest of time, it is highly desirable to be able to load and remove the tape cassette from the cartridge.

A cartridge of the type referred to above is disclosed in U.S. Pat. No. 3,799,420. In this cartridge, a base including a mounting plate supports a filmstrip housing on the upper side, i.e. at the top of the cartridge. On the bottom of the cartridge the mounting plate is provided with downwardly extending end flanges forming a channel which receives the tape cassette. The tape cassette is secured in place by means of an elongated retaining spring which extends from one flange across the full length of the cassette to the other flange. This arrangement for securing the cassette in the cartridge has the disadvantage that the spring is awkward to manipulate and the loading of the tape cassette is a time-consuming operation. Additionally, the retaining spring is a separate piece of the cartridge requiring assembly by the cartridge manufacturer and it also constitutes a relatively costly part of the cartridge.

A general object of this invention is to provide an improved cassette retaining means for such a cartridge and to overcome the above noted disadvantages.

DISCLOSURE OF THE INVENTION

In accordance with this invention, there is provided a projector cartridge which is adapted for quick attachment and release of a magnetic tape cassette in a single motion. This is accomplished by a cartridge having a mounting plate with a pair of retaining hooks for coaction with the cassette. A reaction hook on one end and a cam actuated spring hook on the other end engage the opposite ends of the cassette when it is pressed onto the mounting plate. Preferably, the plate is provided with positioning or alignment means for the cassette. The spring hook yields in such a manner that the hooks snap over respective shoulders on the cassette and lock the cassette in position. In the preferred construction, both retaining hooks are cam-actuated spring hooks and they are formed integrally with the mounting plate. Each of the hooks comprises a cantilever arm extending from the plate perpendicular thereto and has an inwardly projecting nose for camming engagement with the shoulder on the cassette. The plate has a flexible portion at one end on which one of the spring hooks is supported so that the spring hook yields by flexure of the cantilever arm and by flexure of the flexible portion of the plate when the cassette is attached or released.

A more complete understanding of this invention may be obtained from the detailed description that follows taken with the accompanying drawing.

BRIEF DESCRIPTION OF THE DRAWING

FIG. 1 is a pictorial view of the cartridge of this invention with a cassette attached, FIG. 2 is a bottom view of the cartridge, FIG. 3 is a side view taken on lines 3—3 of FIG. 2, and FIG. 4 is an enlarged fragmentary view of one of the retaining hooks for the cassette.

BEST MODE FOR CARRYING OUT THE INVENTION

Referring now to the drawings, there is shown on illustrative embodiment of the invention in a projector cartridge for a 35 millimeter filmstrip and standard magnetic tape cassette.

As shown in FIG. 1, the cartridge comprises a base 10 which is surmounted by a housing 12 adapted to receive a filmstrip (not shown). The housing 12 includes a hinged cover 14 and a fixed front panel 16 which terminates at its upper end in a film-guide bar 18. The cover 14 also includes a guide-bar 20 disposed in spaced relation with the guide-bar 18 to provide a film-slot therebetween for guiding the filmstrip into and out of the cartridge. It will be understood that the filmstrip is stored in a roll-form within the housing 12 at the rear portion thereof and the free end of the filmstrip extends forwardly to a film drive sprocket (not shown) and between the guide-bars 18 and 20 to the framing and optical means of the projector.

The base 10 comprises a mounting plate 22 which supports the housing 12. The front panel 16 of the housing is formed integrally with the mounting plate 22. The base also includes a support member or flange 24 which is formed integrally with the plate 22. The support flange 24 extends from the forward end of the plate 22 to a junction point 26 which is spaced from the rear end of the plate 22. The base also includes a support flange, identical to flange 24, on the other side of the housing 12. The cover 14 of the housing 12 is hingedly mounted at one side thereof upon the flange 24 by pivot pin 28 and is similarly mounted at the other side. Thus, the cover of the housing may be opened for loading of the cartridge with a filmstrip.

A tape cassette 30 of standard design is depicted in FIG. 1. The cassette 30 has a configuration and dimensions according to Standard RS399 of the Electronic Industries Association. It is constructed of molded plastic and comprises two pieces 34 and 36 which are substantially identical in shape and are joined along a seam line 38. Thus, the cassette has an outer configuration which is symmetrical about a plane through the seam line 38. A tape head 40 at the front edge of the cassette 30 is formed with a plurality of windows which allow access to the tape 42. Both side walls of the cassette are flat except for a trapezoidal protrusion 44 and an elliptic protrusion 46 both of which accomodate the tape transport mechanism inside the case. The cassette 30 is also provided with a pair of alignment ribs 48 and 49 at opposite ends. These alignment ribs are provided for insuring proper alignment or positioning of the cassette within a conventional tape recorder. The ribs 48 and 49 are centered on the seam line 38 and are disposed near the front edge of the cassette 30. As best shown in FIG. 4, the ribs 48 and 49 provided with a substantially flat top and bevelled or cam-shaped shoulders. The cassette is also provided with a pair of openings 50 in the protrusion 44 for the purpose of aligning or positioning the cassette in a tape recorder. The cartridge 10 is adapted to receive the tape cassette on the bottom of the mounting plate 22 in a manner which will now be described.

The mounting plate 22 of the cartridge 10 is shown in bottom plan-view in FIG. 2. The mounting plate 22 is substantially rectangular and has front and back parallel edges 52 and 54 and parallel side edges 56 and 58. The outer dimensions of the mounting plate 22 are substantially the same as the outer dimensions of the cassette 30. The mounting plate 22 in flat, except for a trapezoidal recess 60 and an elliptic recess 62 which are provided to receive the trapezoidal protrusion 44 and the elliptic protrusion 46 of the cassette 30. Also, the mounting plate 22 is provided with positioning means for the cassette in the form of a pair of upstanding pins 64. The pins 64 are suitably circular in cross section and are positioned on the plate so they mate in a loose fit with the holes 50 in the cassette 30. The pins 64 have a conical tip and are of such length that they help guide the cassette into position on the plate, as described further below.

The mounting plate 22 is provided with retaining means for releasably attaching the cassette 30 to the cartridge. The retaining means comprises a pair of retaining hooks 66 and 68 which are disposed opposite each other on the edges 56 and 58, respectively, of the mounting plate 22. The hook 66 extends perpendicularly from the plate 22 and comprises a cantilever arm 70 which is formed integrally with the plate 22 and which terminates at its lower end in an inwardly projecting nose 72. The hook 66 is disposed near the front edge 52 of the mounting plate 22 so that it will coact with the rib 48 on the cassette 30, in a manner to be described below. The hook 68 is similar and comprises a cantilever arm 74 which terminates at its lower end in an inwardly projecting nose 76. The hook 68 is disposed near the front edge of the mounting plate 22 in such a position that it coacts with the rib 49 of the cassette 30 when the cassette is properly positioned on the cartridge by the positioning pins 64. The base 10 of the cartridge, including the mounting plate 22 and the hooks 66 and 68 is made of a single piece of molded plastic. As an example, a butyl based plastic is preferred, such as T4500 available from Borg Warner Corporation of Chicago, Ill. Other plastics are also suitable, such as ABS resin of the type sold under the trademark "Cycolac" by the Borg Warner Corporation. In order to produce the base 10 by injection molding, a mold slide is used to form the hooks 66 and 68 with respective noses 72 and 76; thus, apertures 73 and 75 are formed in the plate 22 above the respective noses.

The hooks 66 and 68 are operative to engage a shoulder of the respective ribs 48 and 49 on the cassette to retain the cassette securely in position on the mounting plate 22. The hooks 66 and 68 are adapted to operate in the manner of leaf springs by reason of the flexible arms 70 and 74, respectively, which are mounted in cantilever fashion on the plate 22. It is noted that the hook 66 is attached to the mounting plate 22 at a portion of the plate which is substantially rigid by reason of the support flanges 24 which extend to the edge 56 of the plate. On the other hand, the hook 68 is attached to the plate 22 at a portion which is flexible because the support flanges 24 terminate at the junction 26 which is spaced inwardly from the edge 58 of the plate. By reason of this structure, the hook 66 is adapted to yield in a lateral direction only by reason of its flexure in the manner of a leaf spring. On the other hand to hook 68 is adapted to yield laterally with reference to the plate 22 and it will yield also in a direction perpendicular to the plane of the plate 22 by reason of the flexibility of the plate extension beyond the junction point 26. As noted above, the pins 64 (see FIG. 3) have a length great enough to help guide the cassette into position on the plate 22. For this purpose, the pins 64 project from the plate 22 a distance substantially equal to that portion of the arm 74 which extends between the plate 22 and the nose 76. Thus, when the cassette is placed opposite the mounting plate 22 with the ribs 48 and 49 against the noses 72 and 76, the pins 64 will be at the point of entrance of the holes 50.

In use of the cartridge, a tape cassette is releasably attached by pressing it toward the mounting plate 22 with the cassette positioned so that the holes 50 are aligned with the pins 64. As the cassette is pressed toward the mounting plate 22, the hooks 66 and 70 are flexed outwardly away from each other by reason of the camming action of the ribs 48 and 49 with the respective noses 72 and 76 of the hooks 66 and 68. The hook 66 yields laterally and may serve as a reaction member while the hook 68 yields laterally and upwardly and thus exhibits a greater degree of springiness than hook 66. The flexure of the hook 68 in the lateral direction and the flexure of the plate extension beyond the junction point 26 in the upward direction is illustrated in FIG. 4 in broken lines. The hooks 66 and 68 tend to yield simultaneously to allow the ribs 48 and 49 to pass by the respective noses 72 and 76 on the hooks and the cassette moves into position with an abrupt overcenter motion or snap action. The cassette is securely held in position on the cartridge and is readily removed from the cartridge by grasping it at its edges and pulling it away from the mounting plate 22, preferably with a slight twisting action. This causes the hooks 66 and 68 to yield laterally, i.e., away from each other so that the ribs 48 and 49 on the cassette pass by the respective noses 74 and 76 on the hooks.

Although the description of this invention has been given with reference to a particular embodiment it is not to be construed in a limiting sense. Many variations and modifications will now occur to those skilled in the art. For a definition of the invention reference is made to the appended claims.

What is claimed is:

1. In a projection cartridge for holding a filmstrip and a tape cassette, said cartridge being of the type comprising a base including a mounting plate, a housing mounted on one side of the plate and being adapted to receive a filmstrip and having guide means for guiding the movement of the filmstrip into and out of the housing at a predetermined location relative to said base, the other side of said plate including positioning means and being adapted to receive a tape cassette in a predetermined position relative to said base with the tape head of the cassette coacting with said positioning means, and retaining means for releasably attaching the cassette to the base, the improvement wherein said retaining means comprises a first cam-actuated spring retaining hook mounted on one end of the plate for engaging one end of the cassette and a second cam-actuated spring retaining hook mounted on the other end of the plate for engaging the other end of the cassette, each of said retaining hooks comprising a cantilever arm extending from said plate perpendicular thereto and being integral therewith, each of said cantilever arms having an inwardly projecting nose for camming engagement with a shoulder on said cassette when the cassette is moved toward and away from said plate, whereby the cassette may be attached to said base by pressing it toward the plate in alignment with the positioning means and may be released from the base by pulling it away from said plate.

2. The invention as defined in claim 1 wherein said base includes a support member integral with said plate on said one side thereof, said support member extending from said one end of the plate to a point which is spaced from the other end of the plate, said plate being stiffened throughout the length of said support member and being more flexible from said point to said other end whereby said spring retaining hook on said other end yields by flexure of said plate when said cassette is pressed toward the base to secure it thereto and when it is pulled away from said plate to release it therefrom.

3. The invention as defined in claim 1 wherein said positioning means include a positioning pin extending from said plate adapted to enter a hole in said cassette when the cassette is aligned with the plate, said pin extending outwardly from said plate by a distance substantially equal to that portion of one of said arms between said plate and the nose of said cam.

* * * * *